United States Patent Office 3,222,772
Patented Dec. 14, 1965

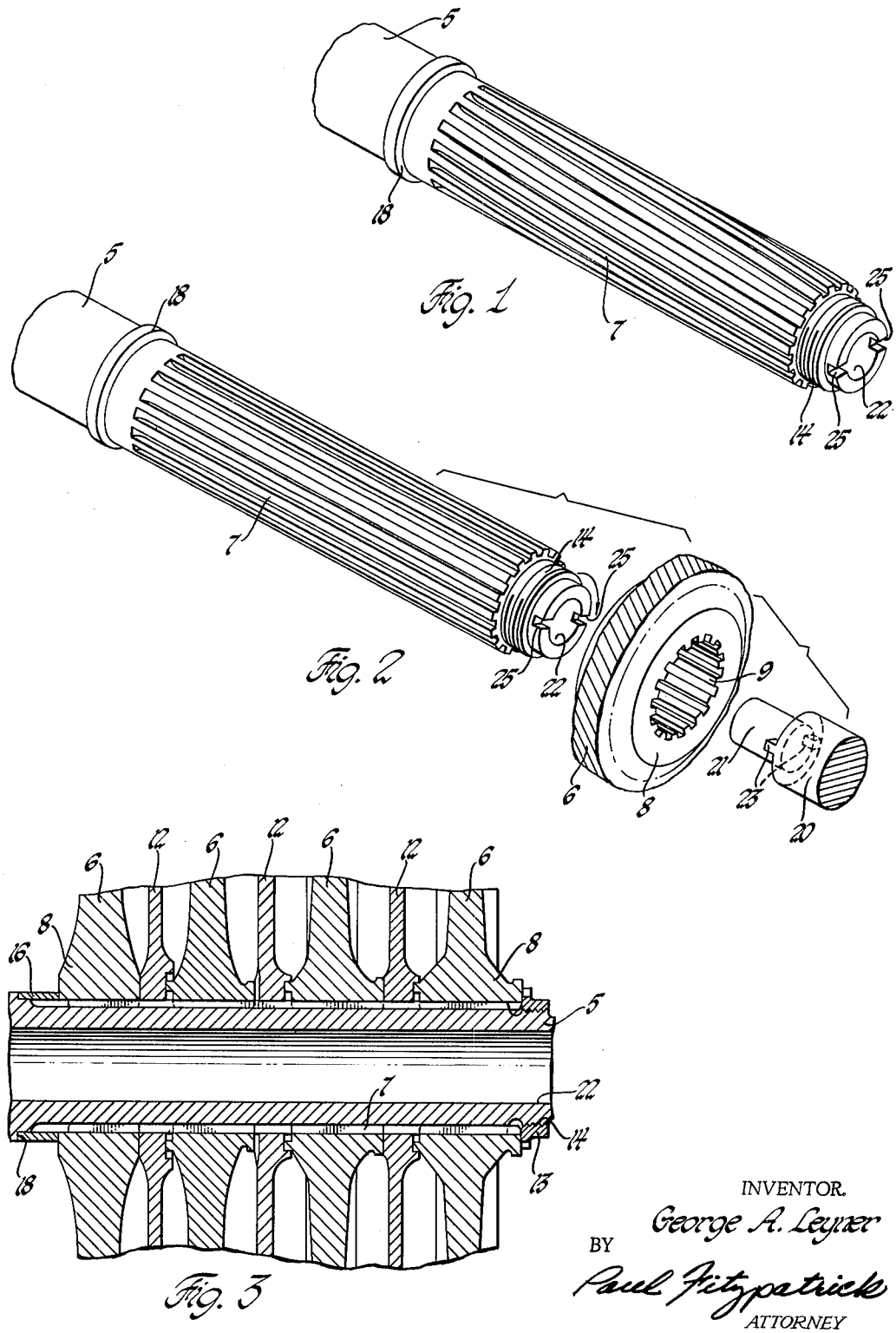

3,222,772
METHOD OF MOUNTING A FIRST MEMBER NON-ROTATABLY AND RIGIDLY ON A SECOND MEMBER
George A. Leyner, Indianapolis, Ind., assignor to General Motors Corporation, Detroit, Mich., a corporation of Delaware
Filed Oct. 15, 1962, Ser. No. 230,656
6 Claims. (Cl. 29—447)

My invention is directed to a method for creating assemblies such as those of wheels on shafts which are rigid and entirely free from any lost motion or shake, but are easy to machine, assemble, and disassemble. The invention has particular relation to the rotors of multistage turbines, but it may be used for many other assemblies.

A simple way to mount a wheel or the like on a shaft is to provide mating splines on them, and this structure is widely used. In the case of multidisk turbine rotors, it has one very serious fault. Since slight clearances have been necessary to permit sliding the disks onto and from the shaft, a small amount of relative motion or play between the parts of such an assembly is possible. In the case of a high-speed turbine rotor, such play prevents the extreme precision in balancing the rotor necessary to obtain vibration-free running.

One approach to the problem is disclosed in Gaubatz U.S. Patent No. 2,652,271; a part of the hub of each disk is a close sliding fit over an unsplined portion of the shaft. This eliminates radial play but not a small degree of relative rotation. Unless each wheel is exactly balanced, such rotation between the wheels will unbalance the rotor.

According to the method of my invention, an interference fit, maintained by elastic deformation of the metal, is provided between the parts so that there is no play at all. A mild interference fit is created by slight deviation of the helix angle of the shaft splines from that of the wheel splines. By putting torsion on the shaft, this interference is temporarily eliminated to facilitate assembly or disassembly of the wheels from the shaft.

The object of my invention is to provide a method of producing rigid assemblies and stable readily-balanced rotors. The accompanying drawings and succeeding detailed description of the preferred embodiment of my invention will make the practice and advantages thereof clear to those skilled in the pertinent arts.

FIGURE 1 is an axonometric view of a turbine shaft.

FIGURE 2 is an exploded view of the shaft and the hub of a wheel before assembly, with a portion of a tool for applying torque to the shaft.

FIGURE 3 is a sectional view of a multidisk turbine rotor, taken on a plane containing the axis.

In the structure shown, a hollow turbine shaft 5 mounts four wheels or disks 6. The shaft has external splines 7 and each wheel has a hub 8 internally bored and with splines 9 mating with shaft splines 7.

Spacer disks 12 are disposed between and impinged by wheels 6. Preferably the spacers are unsplined and each pilots onto the hub of an adjacent wheel. The wheels bear turbine blades (not illustrated) and the spacers do not.

The wheels and spacers are held in mutually abutting relation on the shaft by a nut 13 which mounts on the threaded end 14 of the shaft. A spacing sleeve 16 at the front of the forward wheel 6 abuts a flange 18 on the shaft.

Such a turbine rotor is illustrated more fully in U.S. Patent No. 2,807,434; but a showing of the environment is not necessary to the disclosure of this invention.

The splines 7 and 9 are preferably of standard involute form dimensioned in the usual way for a close sliding fit, except that there is a slight difference between the helix angles of the sets of splines. Preferably, the wheel splines are of zero angle and those of the shaft are at a slight angle, but both may be at an angle, if desired. The difference between the helix angles is a matter of design, depending principally upon the fineness of the spline teeth, the thickness of the hub, the rigidity of the parts, and the clearance of the parts when the splines are parallel. In an installation as shown in the drawings, a helix angle difference of less than one degree ordinarily would be suitable.

The difference in helix angle of the splines should be sufficient to provide an interference fit between the two sets of splines due to the relative twist of the splines so that there is no lost motion or play between the wheel or disk and the shaft once they are assembled.

While conceivably the disks could be forced onto the shaft, this would not be conducive to long life of the parts. However, if the wheel is started on the shaft and the shaft is twisted so that the angles of the two sets of splines are made substantially equal, the wheels may be readily slid into place. Similarly, by applying torque to the shaft to release the interference fit, the wheels may be slipped from the shaft. The twisting of the shaft to assemble and disassemble the parts can be accomplished by any suitable machine or hand tools.

FIGURE 1 illustrates the shaft alone in its original condition with a slight helix angle to the splines. FIGURE 2 is an exploded view illustrating the operation of installing a wheel. The twisting or torsioning tool 20 comprises a shaft which may be rotated by any suitable wheel or handle, or by a machine, a nose 21 adapted to enter the bore 22 in the shaft, and two lugs 23 which engage wrench slots 25 in the end of shaft 5. It will be noted that this arrangement is similar to a known type of screwdriver and, of course, any suitable connection between the shaft and the twisting tool might be employed. Ordinarily, the other end of shaft 5 will be provided with splines or the like which may be used to hold the shaft against the twisting force. It will be clear how the successive wheels are mounted upon the shaft one after another and how they may be removed by twisting the shaft.

It is preferable that the normal torque exerted between the wheels and the shaft in operation of the engine be in the direction to increase the twist of the shaft splines relative to the wheel splines. However, if the force required to untwist the shaft is greater than that applied to or by the wheels, the direction of torque in operation of the engine may be reversed.

It will be apparent that the principles of the invention may be applied to bodies of shapes other than those which might normally be called wheels, and the term "wheel" or "disk" is not intended to convey any sense of limitation. In this respect, the same principles of slightly relatively skewed splines could be used to couple an inner sleeve or shaft to an outer sleeve or shaft.

Another factor which should be mentioned is the fact that in normal operation of turbines the wheels are at higher temperatures than the shaft, which tends to increase any clearance between the wheels and shafts or to reduce the tightness of an interference fit. The amount of interference fit provided should be sufficient to allow for this effect. Put another way, the twist in the shaft may be sufficient to cause the interference fit to remain tight as the wheels expand relative to the shaft, the shaft merely untwisting slightly.

It follows from what has just been said that it is possible to assemble the wheels on the shaft by dimensioning the parts so that there is a slight interference fit due to torsion of the shaft when the temperature differential, if any, resulting from normal operation of the turbine exists, and to perform the assembly of the wheels on the shaft by heating the wheels but not the shaft. In this case, the temperature differential during assembly is sufficiently greater than that during operation so that expansion of the wheels provides the necessary clearance for free assembly and the interference fit is achieved by contraction of the wheel hub which sets up the torsion in the shaft.

Obviously, relative heating and torsion of the shaft could be simultaneously employed to allow free sliding of the wheels onto or off of the shaft.

The description of the preferred embodiment of the invention is not to be considered to limit the invention, since many modifications may be made by the exercise of skill in the art.

I claim:

1. A method of mounting a first member non-rotatably and rigidly on a second member comprising providing a set of external splines on the second member; providing a mating set of internal splines in the first member, the splines being dimensioned for a sliding fit when the helix angles of the sets are substantially identical, the helix angles of the two sets being slightly different in the unstressed condition of the members; effecting a dimensional change in at least one of the members so as to provide a sliding fit between the two sets of splines; sliding the first member onto the second member so that the sets of splines are engaged; and substantially reestablishing the normal dimensions of the members so as to create an interference fit between the two sets of splines due to the inequality of helix angle of the splines.

2. A method of mounting a body non-rotatably and rigidly on a shaft comprising providing a set of external splines on the shaft; providing a mating set of internal splines in the body, the splines being dimensioned for a sliding fit when the helix angles of the sets are substantially identical, the helix angles of the two sets being slightly different in the unstressed condition of the shaft and body; raising the temperature of the body relative to the shaft so as to provide a sliding fit between the two sets of splines; sliding the body onto the shaft so that the sets of splines are engaged; and reducing the difference of temperature of the body and the shaft so as to create an interference fit between the two sets of splines due to inequality of helix angles of the splines.

3. A method as recited in claim 2 in which the body is a turbine wheel.

4. A method of mounting a first member non-rotatably and rigidly on a second member comprising providing a set of external splines on the second member; providing a mating set of internal splines in the first member, the splines being dimensioned for a sliding fit when the helix angles of the sets are substantially identical, the helix angles of the two sets being slightly different in the unstressed condition of the members; applying torque to and twisting at least one of the members so as to substantially equate the pitches of the two sets of splines; sliding the first member onto the second member so that the sets of splines are engaged; and releasing the torque on the torqued member to allow the member to untwist so as to create an interference fit between the two sets of splines due to the inequality of helix angle of the splines.

5. A method of mounting a body non-rotatably and rigidly on a shaft comprising providing a set of external splines on the shaft; providing a mating set of internal splines in the body, the splines being dimensioned for a sliding fit when the helix angles of the sets are substantially identical, the helix angles of the two sets being slightly different in the unstressed condition of the shaft and body; applying torque to and twisting the shaft so as to substantially equate the helix angles of the two sets of splines; sliding the body onto the shaft so that the sets of splines are engaged; and releasing the torque on the shaft to allow the shaft to untwist so as to create an interference fit between the two sets of splines due to the inequality of helix angles of the splines.

6. A method as recited in claim 5 in which the body is a disk.

References Cited by the Examiner
UNITED STATES PATENTS

| | | | |
|---|---|---|---|
| 1,367,500 | 2/1921 | Redmon et al. | 287—53 |
| 1,803,995 | 5/1931 | Chilton | 287—53 |
| 1,911,430 | 5/1933 | Cautley | 29—447 |
| 2,129,257 | 9/1938 | Bauchmann | 29—447 |
| 2,228,770 | 1/1941 | LeTourneau | 287—53 |

WHITMORE A. WILTZ, *Primary Examiner.*

CARL W. TOMLIN, *Examiner.*